Oct. 6, 1931.  J. E. BELL  1,825,933
WATER BACK FOR STEAM GENERATORS
Filed July 26, 1924   5 Sheets-Sheet 1

Oct. 6, 1931.   J. E. BELL   1,825,933
WATER BACK FOR STEAM GENERATORS
Filed July 26, 1924   5 Sheets-Sheet 2
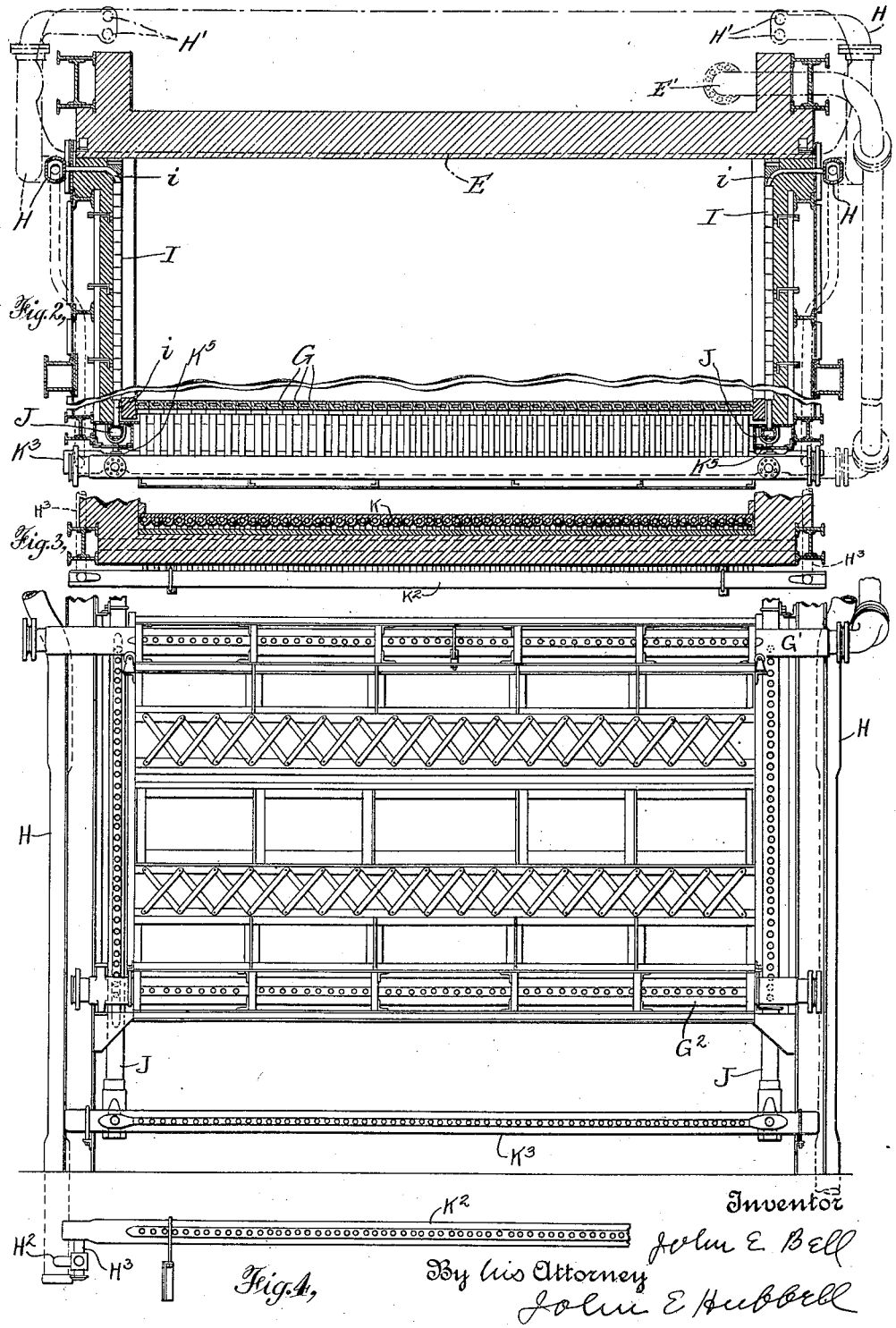
Inventor
John E. Bell
By his Attorney
John E Hubbell

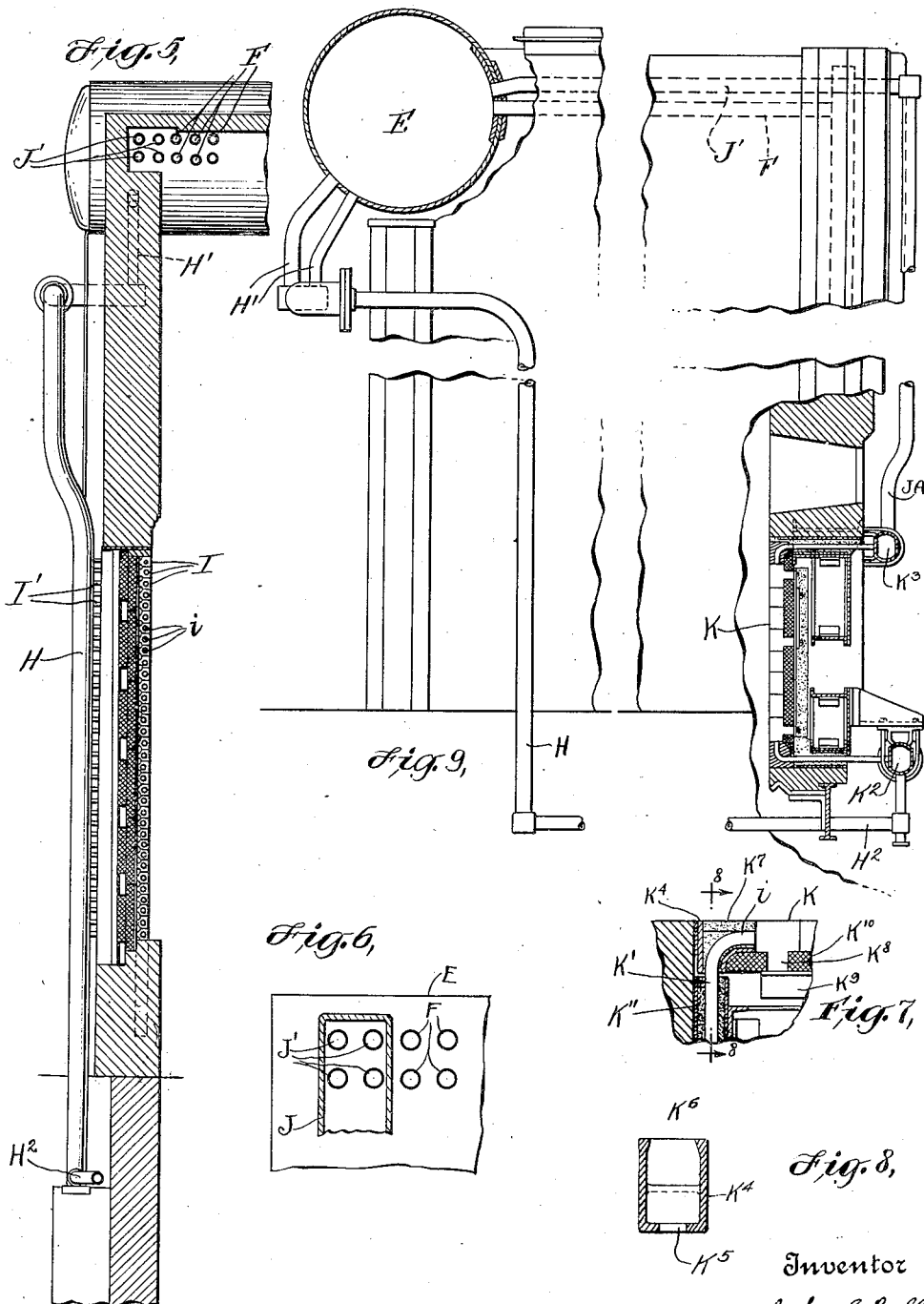

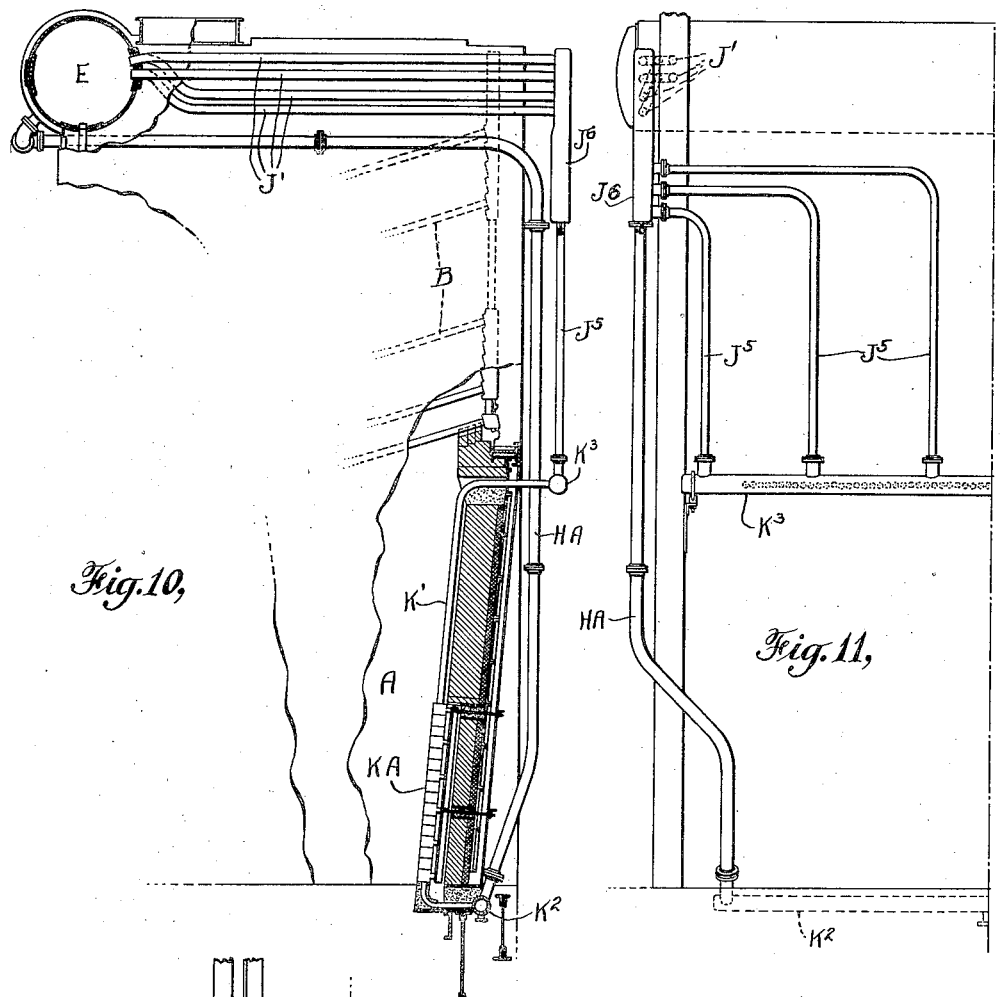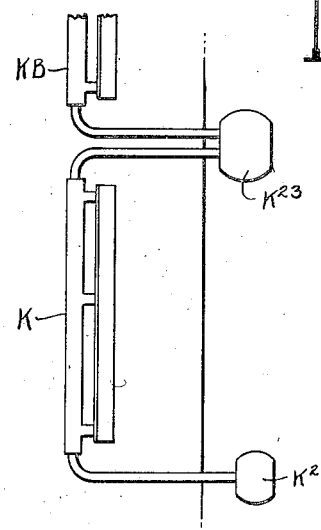

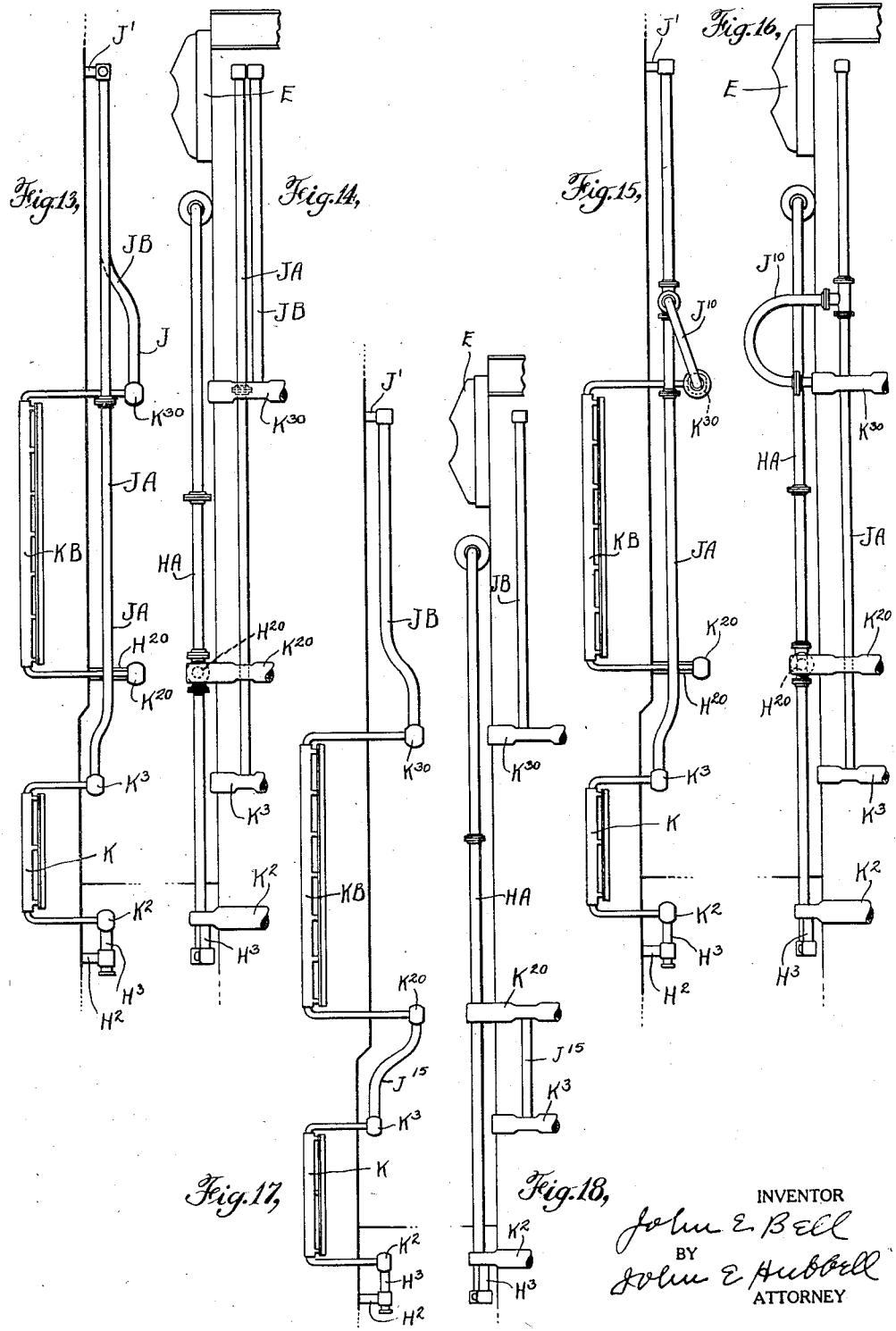

Patented Oct. 6, 1931

1,825,933

UNITED STATES PATENT OFFICE

JOHN E. BELL, OF BROOKLYN, NEW YORK, ASSIGNOR TO FOSTER WHEELER CORPORATION, OF NEW YORK, N. Y., A CORPORATION OF NEW YORK

WATER BACK FOR STEAM GENERATORS

Application filed July 26, 1924. Serial No. 728,306.

The major object of the present invention is to provide an improved water back or channelled structure forming a water cooled lining for the clinker or ash pit of a boiler furnace and incorporated in the water circulating system of the boiler, and serving to eliminate or minimize the injurious effects on the wall of an ash pit of high combustion chamber temperatures, slag and the abrasive action of fuel and ashes, and which at the same time desirably and efficiently augments the boiler heating surface, or reduces the amount of such surface otherwise required in a boiler of given capacity.

The use of a water back in the wall of a clinker pit and portions of the combustion chamber walls adjacent the fuel bed in boiler furnaces has long been known, and the present tendency to more efficient combustion, in many cases by the use of preheated air for combustion, with a resultant increase in combustion chamber temperatures above those at which combustion chamber walls formed of refractories in the usual manner are durable, have led to attempts to extend water backs to protect portions of the combustion chamber walls remote from the fuel beds. Heretofore, however, the use of such water backs has been attended with certain serious practical disadvantages which it is the object of the present invention to overcome.

In water backs as heretofore used in boiler furnaces, difficulty has been experienced from the destruction of the water backs by contact with the fuel products or residue or burning gases, particularly with the high combustion chamber temperatures necessary for high thermal efficiency. In accordance with the present invention, I form water backs out of conduit elements of the character which have been developed for use in so-called radiant heat superheaters, and in the preferred mode of practicing my invention I employ elements of the character disclosed in my prior Patent No. 1,296,739, which are composed of wrought steel tubes enclosed by a relatively massive cast metal casing usually formed of perforated blocks of cast iron strung on the tubes and shrunk in place thereon. This new use of the conduit elements disclosed in my said prior Patent No. 1,296,739, is attended with important advantages not attained in the use of such elements in superheating steam, and an understanding of which may be facilitated by the following explanation:

In a boiler furnace, regardless of the character of the fuel burned, the combustion chamber walls are inevitably subjected to the alternate action of reducing and oxidizing flames. Regardless of how much excess air for combustion may be supplied, the exposed surfaces of the combustion chamber walls will be occasionally licked by tongues of flame and bodies of burning gases which are reducing in character, and regardless of how low a percentage of excess air for combustion may be employed, the same surfaces will be intermittently licked by tongue flames and bodies of burning gas which are highly oxidizing. In the case of radiant heat superheaters, I have found that as an apparent result of this alternate oxidizing and reducing action, the cast iron casing blocks for the superheater elements in some furnace locations will rapidly deteriorate, the deterioration being largely due to a flaking off of the cast iron in flakes a sixty-fourth of an inch or so in thickness. I have discovered, however, that this flaking action does not occur, or at least in a degree seriously objectionable, when the cast iron encased tubes are used in a water back owing to the lower temperature at which the water filled elements are maintained. In consequence it is practically feasible to locate the water backs of the special construction described, in portions of the furnace wall structure where such water backs are most useful, and where a superheater of the same construction could not be successfully employed.

Another and important advantage attained with water backs composed of tubes encased in heavy iron sections as described, for which there is no analogy in the case of a superheater constructed of similar elements, arises from the beneficial effect on the water circulation through the water backs of the heat storage and temperature equalizing effect of the casing.

With an ordinary water back formed of thin walled tubes and located in the portion of the furnace structure where it is most needed, it is almost impossible from a practical standpoint, to avoid occasional rates of heat absorption in localized portions of the water back which are high enough to produce steam pockets impeding, stopping, or even reversing the water circulation, especially as practical considerations make it necessary to keep the number of connections from the water backs into the boiler drums as small as possible. The formation of a steam pocket in an ordinary thin walled water back is apt to result in destructive overheating of the portion of the water back filled with steam. With water backs constructed in accordance with the present invention, steam pockets are not apt to be formed as the result of intermittent and temporary increases in the heat absorption rate of localized portions of the water back because of the heat storage capacity of the casing. In consequence of this heat storage capacity, on a sudden increase in the rate of heat absorption by any localized portion of the water back, an appreciable portion of the heat then absorbed is utilized in raising the temperature of the casing. This tends of itself to reduce the rate of heat absorption, and checks any sudden increase in the rate of heat transfer to the water space surrounded by the casing. Moreover the over heated localized portion of the water back casing transfers heat by conduction to adjacent portions of the casing as well as to the adjacent water space. Furthermore, when a steam pocket is formed in a localized portion of the water back, the portion of the water back structure between the steam pocket and the fire is not quickly overheated to the point of destruction because of the heat transfer by conduction from said portion to other portions of the water back.

Some of the advantages obtained with water backs formed of steel tubes encased in cast iron blocks may be obtained by the use of cast steel elements such as are now in use in radiant heat superheaters, but for water back purposes elements formed of wrought steel tubes encased in iron blocks are preferable to cast steel elements, because they are substantially cheaper, and because they do not have the tendency to bow or bend in planes parallel to their length which is characteristic of cast steel elements. The use in water backs of the wrought steel tubes encased in cast iron blocks also facilitates and cheapens the cost of making satisfactory end connections to the elements, and the tubes encased in cast iron may be readily cleaned internally which is necessary in the case of water backs but not in superheaters.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred forms of my invention.

Of the drawings:

Fig. 2 is a section on the broken line 2—2 of Fig. 1;

Fig. 3 is a partial section on the line 3—3 of Fig. 1;

Fig. 4 is a rear elevation of a portion of the steam generator shown in Fig. 1;

Fig. 5 is a section on the line 5—5 of Fig. 1;

Fig. 6 is a partial section on the line 6—6 of Fig. 1;

Fig. 7 is an enlarged section of a portion of the apparatus shown in Fig. 1;

Fig. 8 is a section on the line 8—8 of Fig. 7;

Fig. 9 is an elevation with parts broken away and in section of a modified construction;

Fig. 10 is a view taken similarly to Fig. 9 illustrating a second modification;

Fig. 11 is a partial rear elevation of the portion of the boiler shown in Fig. 10;

Fig. 12 is a diagrammatic elevation of a portion of a steam generator in which the radiant heat absorbing elements incorporated in one wall are divided into two separate sets arranged one above another;

Fig. 13 is a view taken similarly to Fig. 12 illustrating another mode of connecting two water back sections into the boiler circulating system;

Fig. 14 is a partial rear elevation of the construction shown in Fig. 13;

Figure 1:
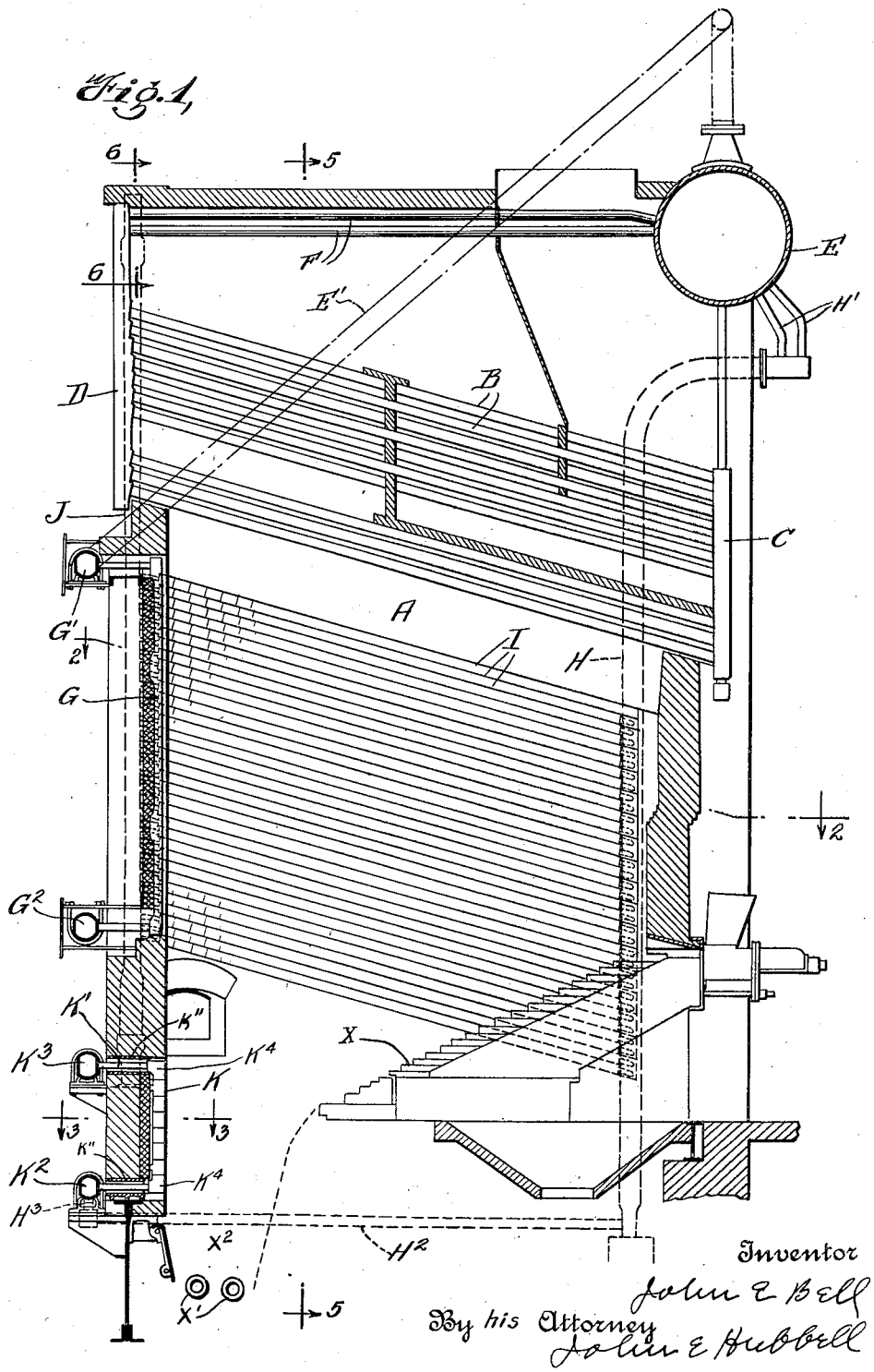
Fig. 1 is an elevation in section of a steam generator including elements forming a boiler, a furnace chamber below the boiler comprising a combustion chamber and a stoker and ash or clinker pit below the combustion chamber.

Figs. 15 and 16 are views taken similarly to Figs. 13 and 14, respectively, illustrating a third connection arrangement; and Figs. 17 and 18 are views taken similarly to Figs. 13 and 14, respectively, illustrating still another connection arrangement.

In the drawings and referring first to the construction shown in Figs. 1 to 6, A represents the combustion chamber of a steam generator at the upper end of which is located a water tube boiler comprising the usual water and steam containing elements. In the conventional form illustrated, the boiler proper is of the so called horizontal water tube cross drum type, the inclined water tubes B being connected at their ends into front and rear headers C and D. The headers C are connected by elongated nipples into the steam and water drum E and the upper ends of the rear headers D are connected to the rear of the drum E by horizontal circulating tubes F. In the construction shown, the boiler steam pipe E' leads from the drum E to the top inlet header G' of a radiant heat superheater comprising elements G connected between the inlet header G' and a lower outlet header G². The elements G are incorporated in and form a lining for the upper portion of the rear wall of the combustion chamber. The superheater shown is of the general type of my prior Patent No. 1,296,739, and is of the improved form disclosed and claimed in an application for patent Serial No. 634,713 filed April 26, 1923 by John Anderson and myself patented April 28, 1931, Patent No. 1,802,456.

In accordance with the present invention, provisions now to be described are made for cooling the side walls and the lower portion of the rear wall of the combustion chamber A. The provisions illustrated for cooling the side walls of the combustion chamber comprise a series of tubular elements I advantageously inclined at or about the same angle to the horizontal as the water tubes B. As shown in Figs. 2 and 5, each tubular element I comprises an inner tube $i$ and a sectional casing therefor which may be formed of perforated blocks of cast iron. The casing sections are rectangular in outline and the various casing sections for the elements I in each side wall unite to form a smooth inner heat absorbing surface. The lower ends of the bare tubes $i$ at the front of the boiler are out-turned and connected into a corresponding vertical inlet header H. Each header H is connected at its upper end to the lower portion of the drum E through the tubes H'. As shown, the upper end of each header H is bent over and extends horizontally and the tubes H' which are also bent have their end portions connected to the header extending transversely away from the latter, this arrangement permitting the thermal expansion and contraction of the parts without subjecting them to undue strain. At the rear of the boiler the ends of the bare tubes $i$ extend through the furnace housing wall and are secured into corresponding vertical headers J. Each header J is connected at its upper end to the steam and water drum E through one or more horizontal tubes J' similar in construction and arrangement to the horizontal circulating tubes F which are alongside. In the arrangement shown, each header is intended to be connected to the drum E by four tubes J'. The elements I are supported and held in alignment by connections from a plurality of the casing sections of each element to supporting frame members, but this need not be illustrated and described in detail herein as this structure is similar in this respect to radiant heat superheaters now in use.

Incorporated in the rear wall below the radiant heat superheater G and extending downward from approximately the same level as that of the lower end of the inclined upper surface of the stoker X and substantially co-extensive with the vertical extent of the ash or clinker pit X² is a water back K composed of vertical elements each comprising a bare tube K' having out-turned horizontal extending end portions connected into the lower and upper horizontal headers K² and K³, respectively, of the waterback. The body portions of the bare tubes are encased in blocks of cast iron similar to those employed in the elements I. The headers K² and K³ are supported on brackets which may be secured to columns or buckstays forming a part of metallic frame work of the boiler housing. In the construction illustrated in Figs. 1 to 6, the waterback K is connected into the boiler circulating system through the headers H and J, the lower inlet header K² of the waterback being connected at each end to the lower end of the corresponding header H by a horizontal pipe H². The upper outlet header K³ of the waterback K is connected to the lower end of the adjacent header J through a horizontal nipple or pipe connection K⁵. Suitable provisions are required to accommodate the thermal elongation and contraction of the body portions of the water back elements without permitting undue warping or bending movements of said body portions and without creating objectionable stresses and strains in the elements and their connections into the boiler circulating system, or in the boiler housing and without giving rise to air leakage through the latter. The manner in which these results are obtained with respect to the water back K is illustrated in Figs. 1, 7, and 8. As shown in the last mentioned figures, a special cast metal elbow casing K⁴ is provided at each end of the vertical body portion of each tubular element. The elbow portion of each bare end of each tube K' passes through a corresponding casing K⁴, suitable refractory material in the form of tiles or fire bricks K⁷ being mounted in the casing K⁴ in front of the otherwise exposed elbow portion of the bare end of the tube K'. As shown the open inner side of the casing K⁴ is undercut to hold the refractory material K⁷ in place. The horizontal portion of the bare tube K' passes snugly through a whole case K⁶ formed for the purpose in the outer end of the elbow casing. The portions of the bare tubes K' at the outer ends of the elbow casings K⁴ pass through a cellular honey-comb like structure K¹¹ of cast metal parts incorporated in the housing wall. The spaces about the bare tubes K' in the channels thus provided, may advantageously be packed with Sil-o-cel or like material which prevents heat radiation losses and prevents air leakage through the channel without interfering with the bending and bodily up and down movements of the transverse end portions of the tubes K' necessary as the body portions of the tubes K' thermally elongate and contract, to avoid subjecting the elements or their connections to the rigidly mounted headers K² and K³ to objectionable stresses. To prevent the body portions of the elements K from undue warping or bending movements some of the cast metal casings and sections are advantageously provided with lugs K⁸ for attachment to stiffening and aligning metallic members K⁹ at the rear of the elements K and separated from the latter by suitable heat insulating material K¹⁰.

With the described arrangement of the side and rear wall waterbacks and the superheater, the side walls and rear wall are largely lined by metallic heat absorbing heat apparatus, thus directly cooling these walls and indirectly cooling and protecting the front wall of the combustion chamber partly by lowering the temperature in the combustion chamber and partly by the obsorption of radiant heat from the front wall of the combustion chamber. This cooling of the combustion chamber walls is a matter of great practical importance, as the modern tendency to more efficient combustion with a relatively low amount of excess air and with that air preheated in many instances tends to the production of furnace chamber temperatures high enough to effect a rapid destruction of fire brick furnace walls. By abstracting heat from the combustion chamber with water backs incorporated in the combustion chamber walls as described herein, the most efficient combustion practically obtainable may be maintained without overheating the combustion chamber walls. While the heat which they absorb from the combustion chamber lowers the temperature of the furnace gases and decreases the amount of heat available for recovery by the ordinary boiler water tubes, the water backs and the radiant heat superheaters G form highly efficient heat absorbing devices, and their use permits of a reduction in the total boiler heating and superheating surface otherwise required for a given steam generating and superheating capacity.

The water back illustrated in Figs. 1 to 6 is characterized by the simplicity and effectiveness of the means of connection into the water circulating system of the boiler proper and the supply thereto of water at the rapid rate required to keep the water back elements filled with water notwithstanding their rapid absorption of heat. It will be observed that notwithstanding the comparative simplicity of the pipe connections between the water elements and the boiler system proper, good advantage is taken of the circulation producing effect resulting from the difference in density of the water supplied through the down-comers H to the water elements and the ascending column of water in the risers J which is lighter both because the water is hotter and also because of entrained steam bubbles. It is especially to be noted that the down-comers H by virtue of their shape and disposition may readily be made of ample size to insure an adequate supply of water to the lower ends of the elements of the water back K as well as to the lower ends of the elements I. Furthermore, the character of the connections shown in Figs. 1 to 6, as well as in the other forms of the invention illustrated, permit of the ready use of the invention with existing types of boilers, and make it possible to provide existing boiler furnace installations with water backs at a minimum of expense and trouble. The length of the horizontal tubes J', and the connection of the bent tubes H' to the horizontally turned upper end of the down-comer H provide the flexibility required to accommodate thermal expansion and contraction in boiler and water backs.

Water backs composed of wrought steel tubes encased in cast iron blocks, as described, possess special advantages over water backs heretofore constructed in addition to the important advantages to which reference has already been made. As a result of the flexibility of the steel inner tubes and the relatively short length of the individual casing blocks, thermal expansion and contraction has small tendency to destroy the elements, and, in consequence, the elements unite to provide a heat absorbing surface which is smooth enough to minimize the adherence of slag and ashes and to facilitate the cleaning of the surface when this is necessary. Furthermore, the massive character of the casing blocks renders them immune to injury by the impingement of bars or other tools used in removing adhering slag. It will be apparent, of course, that should conditions of use result in surface injury to the casing blocks, much such surface deterioration may occur without appreciable reduction in the effectiveness of the water back. While the joint between the tubes and the casing blocks offers resistance to the flow of heat from the casing blocks into the tubes, this is not especially objectionable from any point of view, because this resistance is never sufficient to prevent the rate at which heat is taken up by the water from being rapid enough to make the element an extremely efficient portion of the boiler heating surface. Moreover the reduction in effective heat absorption caused by this point resistance tends to the avoidance of difficulties in maintaining a proper water circulation. The use of an effective water back immediately adjacent the fuel bed is especially advantageous because of the slag cooling effect, which prevents any such serious results from slag adherence to the furnace walls as is a common source of annoyance and injury to ordinary fire brick walls, particularly when the furnace is provided with a mechanical stoker which is intermittently operated.

The use of the invention makes it readily possible to extend the water back K at the rear of the stoker downward as far as may be required to effectually cool the slag and ashes passing to the ash removing means and to protect the latter as well as the adjacent portion of the stoker mechanism against overheating by absorbing radiation heat therefrom. As conventionally illustrated in Fig. 1 the ash removing means comprise the customary clinker grinder rolls X' located at the bottom of the clinker pit $X^2$. It will be readily apparent that a water back may be used at the rear of the stoker in cases where it is not desirable to employ the water backs I, or where if the latter be used it is desirable to separately connect the water backs into the boiler system. In such a case the water back K may advantageously have its water back header $K^3$ connected to the steam and water drum E by means of tubes J' alongside the circulating tubes F, and external vertical riser pipes JA as shown in Fig. 9.

Fig. 10 illustrates a form of water back KA which may advantageously be employed in some cases particularly in the rear wall of a combustion chamber not provided with a radiant heat superheater as in the construction shown in Figs. 1 to 8. The water back KA differs from the water back K first described primarily in the fact that the vertically disposed body portions of the tubes K' are vertically elongated so that the upper water back header $K^3$ of Fig. 10 is located at about the same level as the upper superheater header G' in Fig. 1. The upper portions of the vertically disposed parts of the tubes K' in the particular arrangement shown in Fig. 10 are not surrounded by casing blocks of cast metal but are directly exposed to the interior of the combustion chamber. The reduction in radiant heat absorbing surface which the omission of the casing blocks entails, reduces the heat absorption by the elements which may be desirable when, owing to their relatively great length the elements would otherwise tend to absorb heat at a rate so rapid as to make it difficult to keep the elements filled with water by gravity circulation. The circulation in the water back KA is aided by the provision of a plurality of take-off pipes $J^5$ connected to the upper back header $K^3$ at intervals along the latter. The take-off pipes $J^5$ are connected into the water drum E through headers $J^6$ at the side edges of the rear end of the boiler and corresponding horizontally disposed circulating tubes J'. It will be seen that in both the structures shown in Fig. 1 and Fig. 10 the water wall is positioned and has sufficient vertical extent to provide a water wall surface for substantially the vertical extent of the ash pit.

In some cases it is desirable to reduce the length of water back elements incorporated in a single combustion chamber wall by employing a plurality of water back sections shown for example in Figs. 13 to 18. The water back sections K and KB shown in those figs., are, separately considered, similar in construction to the water back K previously described, the water back section KB being located above the water back section K. As shown in Fig. 12, the out-turned upper end of the bare tube portions of the water back section K and the lower out-turned ends of the bare tubes of the upper water back section KB are connected by an external header $K^{23}$. As shown in Figs. 13 and 14 water is supplied to the inlet header $K^2$ of the water back header K through branches $H^2$ from down-comers HA which may be similar in their arrangement and in their connections to the water drum E, to the down-comers H previously described. The inlet header $K^{20}$ of the water back section KB is supplied with water from the down-comer pipes HA by branch pipes $H^{20}$. The outlet headers $K^3$ and $K^{30}$ of the water back sections KB and K are separately connected at their ends to the steam and water drum by means of individual risers JA and JB, respectively, each of which may be similar to the riser JA of Fig. 9 and be similarly connected by tubes $J^7$ to the drum E. With this arrangement the two water back sections K and KB are connected in parallel so to speak, between the common down-comers HA and the steam and water drum.

In the arrangement shown in Figs. 15 and 16, the water flow through the elements of the water back section K and KB is in parallel as in Figs. 13 and 14, but in lieu of the separate risers JB for the water back section KB, the outlet header $K^{30}$ of the latter is connected at its ends by bent pipes $J^{10}$ into the risers JA. Except for this difference the arrangement shown in Figs. 15 and 16 is the same as that shown in Figs. 13 and 14. The arrangement shown in Figs. 17 and 18 differs from that shown in Figs. 13 and 14 in the omission of the risers JA and by the addition of bent pipes $J^{15}$ connecting the ends of the outlet header $K^3$ of the water back section K to the ends of the inlet header $K^{20}$ of the water back section KB, so that with this arrangement the water passes in series first through the elements of the water back section K and then through the elements in the water back section KB.

It will be observed that in most of the forms of water back constructions illustrated, the water back conduit elements, the structural supporting frame members at the outer sides of said elements, and the heat insulating material at the outer side of the elements, form a unitary furnace wall section. Novel features of construction and arrangement pertaining to the sectional water headers illustrated in Figs. 10 to 18 not specifically claimed herein, are claimed in my divisional application Serial No. 83,789, filed January 6, 1926, Pat. No. 1,666,483, granted April 17, 1928.

While in accordance with the provisions of the statutes I have illustrated and described the best forms of my invention now known to me, it will be apparent to those skilled in the art that changes may be made in the form of the apparatus disclosed without departing from the spirit of my invention and that certain features of my invention may sometimes be used with advantage without a corresponding use of other features.

Having now described my invention what I claim as new and desire to secure by Letters Patent, is:

1. A steam generator comprising elements forming a boiler, wall structure enclosing a combustion chamber, stoker apparatus within said wall structure, and defining the lower extent of the combustion chamber, said wall structure extending below the combustion chamber and providing an ash pit and including a water wall positioned to be contacted by residue resulting from burning of fuel on the stoker, said water wall being positioned and having sufficient vertical extent to provide a water wall surface for substantially the vertical extent of the ash pit, an upper horizontally disposed header for said water wall outside said wall structure, a lower horizontally disposed header for said water wall outside said wall structure, said water wall comprising tubes having vertically extending heat absorbing portions and end portions extending through the wall structure and connected to the upper and lower horizontally disposed headers outside said wall structure and metal blocks contacting the vertical heat absorbing portions of the water wall tubes and having smooth exposed faces forming a substantially smooth continuous inside wall surface of the ash pit for contact with said residue and transmitting heat from the residue to the water wall tubes, a downflow conduit connecting the boiler with the lower horizontal header, an upflow conduit connecting the upper horizontal header with the boiler, and the vertical extent of the heat absorbing portions of the water wall tubes being sufficient to induce gravity circulation therethrough due to heat supplied to said vertically extending heat absorbing portions.

2. In a steam generator comprising a water tube boiler and a furnace chamber beneath it, the improvement which consists in a water back lining for a portion of the furnace chamber wall composed of vertical tubular elements located at the inner side of said wall and transverse end connections passing through said wall, inlet and outlet headers to which the lower and upper end connections are respectively connected and a separate connection between each end of each header and the boiler proper for maintaining a gravity circulation of water through said elements.

3. A water back element comprising a tube having a body portion and end portions transverse to the body portion and adapted to extend through the wall of a furnace chamber lined by the body portion of the element, perforated casing blocks strung on the body portion of the element and a cast metal casing for the elbow portion of the tube open at the furnace chamber side of the latter, and provisions for holding refractory heat insulating material in said opening.

4. A water back element comprising a tube having a body portion surrounded by a metallic casing and an end portion extending transversely to the body portion and adapted to pass through a furnace wall, a cast metal casing section for the adjacent portions of the body and end portions of the tube, said casing section being open at the furnace side of the element and adapted to hold a refractory heat insulating shield in front of said end portion.

5. In a steam generator comprising a water tube boiler of a cross drum type and a combustion chamber beneath the boiler, the improvement which consists in water backs in the side walls of the generator and a water back in the rear wall of the generator, the rear wall water back being composed of vertical tubular elements with horizontal headers connected to the lower and upper ends of the elements and the side wall water back being composed of tubular elements inclined to the horizontal and vertical inlet and outlet headers to which the lower and upper ends of the inclined tubes are connected, a connection between the upper end of each of said vertical inlet headers and the steam and water drum of the boiler, a connection between the lower ends of the vertical inlet headers and the inlet header of the rear wall water back, connections between the outlet header of the rear wall water back and said vertical outlet headers, and tubes alongside the boiler circulator tubes between the last mentioned headers and the steam and water drum.

6. In a steam generator comprising a water tube boiler and a furnace chamber, the improvement which consists of vertically disposed elements forming a lining for a portion of the chamber wall and connections between the boiler and said tubes for maintaining a gravity circulation of water through the latter, said connections comprising an inlet header connected to the lower ends of said elements and a downcomer pipe having its lower end connected to said header and having a transversely extending upper end portion and a plurality of pipes transverse to and connecting said end portion to the boiler.

7. In a steam generator comprising a water tube boiler and a furnace chamber beneath the boiler, the improvement which consists in a water back lining for a vertically extended lower portion of a chamber wall composed of vertical tubular elements at the inner side of said wall and an outlet header to which the upper ends of said elements are connected, and connections between the water back and the boiler for maintaining a gravity circulation of water through said elements, said connections including a plurality of outlets from said header distributed along the length of the latter and conduits connected thereto and extending into proximity with the sides of the combustion chamber extending transversely to said headers.

8. In a steam generator comprising a water tube boiler and a furnace chamber beneath it, the improvement which consists in a water back lining for a portion of the furnace chamber wall composed of vertical tubular elements located at the inner side of said wall and transverse end connections passing through said wall, inlet and outlet headers to which the lower and upper end connections are respectively connected and a plurality of spaced connections between each header and the boiler proper for maintaining a gravity circulation of water through said elements.

9. In combination with a steam boiler having a steam and water drum, a furnace chamber, a plurality of water tubes vertically arranged in said chamber so as to receive radiant heat therefrom, downtake and uptake connections between said tubes and boiler drum, said downtake connection comprising a conduit outside the boiler setting, and a plurality of spaced nipples connecting the upper end of said conduit to the water space of the drum.

Signed at New York city in the county of New York and State of New York this 15th day of July A. D. 1924.

JOHN E. BELL.